United States Patent [19]
Walker et al.

[11] Patent Number: 5,829,049
[45] Date of Patent: *Oct. 27, 1998

[54] SIMULTANEOUS EXECUTION OF TWO MEMORY REFERENCE INSTRUCTIONS WITH ONLY ONE ADDRESS CALCULATION

[75] Inventors: William L. Walker; Mark R. Storey; Patrick Knebel; Stephen R. Undy, all of Fort Collins, Colo.

[73] Assignee: Hewlett-Packard Company, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 785,105

[22] Filed: Jan. 21, 1997

Related U.S. Application Data

[63] Continuation of Ser. No. 322,050, Oct. 12, 1994, abandoned.

[51] Int. Cl.$^6$ .................................................... G06F 9/28
[52] U.S. Cl. ........................... 711/168; 711/150; 711/167
[58] Field of Search ................................ 711/1, 100, 150, 711/168, 167; 395/588, 380, 382, 800.23, 391; 365/240

[56] References Cited

U.S. PATENT DOCUMENTS

| | | | |
|---|---|---|---|
| 4,381,541 | 4/1983 | Baumann et al. | 744/128 |
| 4,438,493 | 3/1984 | Cushing et al. | 711/218 |
| 5,283,874 | 2/1994 | Hammond | 395/382 |
| 5,335,330 | 8/1994 | Inoue | 395/588 |
| 5,416,749 | 5/1995 | Lai | 365/240 |

OTHER PUBLICATIONS

Johnson, Mike. "Superscalar Microprocessor Design", Prentice Hall, NJ. p. 20, 1991.

*Primary Examiner*—Eddie P. Chan
*Assistant Examiner*—Than V. Nguyen
*Attorney, Agent, or Firm*—Augustus W. Winfield

[57] ABSTRACT

A method of improving the performance of a computer processor by recognizing that two consecutive register instructions can be executed simultaneously and executing the two instructions simultaneously while generating a single data address and while performing exception checking on a single data address. During an instruction fetch process, two consecutive instructions are tested to determine if both are either register load instructions or register save instructions. If both instructions are load or save register instructions, the corresponding data addresses are tested to see if both data addresses are in the same double word. If both data addresses are in the same double word, then the instructions are executed simultaneously. Only one data address generation is required and exception processing is performed on only one data address. In one example embodiment, a simplified test rapidly ensures that both data addresses are in the same double word, but also requires the base addresses to be at an even word boundary. In a second embodiment, where the processor includes an alignment test as a separate test, an even more simple test rapidly ensures that both data address are in the same double word without checking alignment.

10 Claims, 6 Drawing Sheets

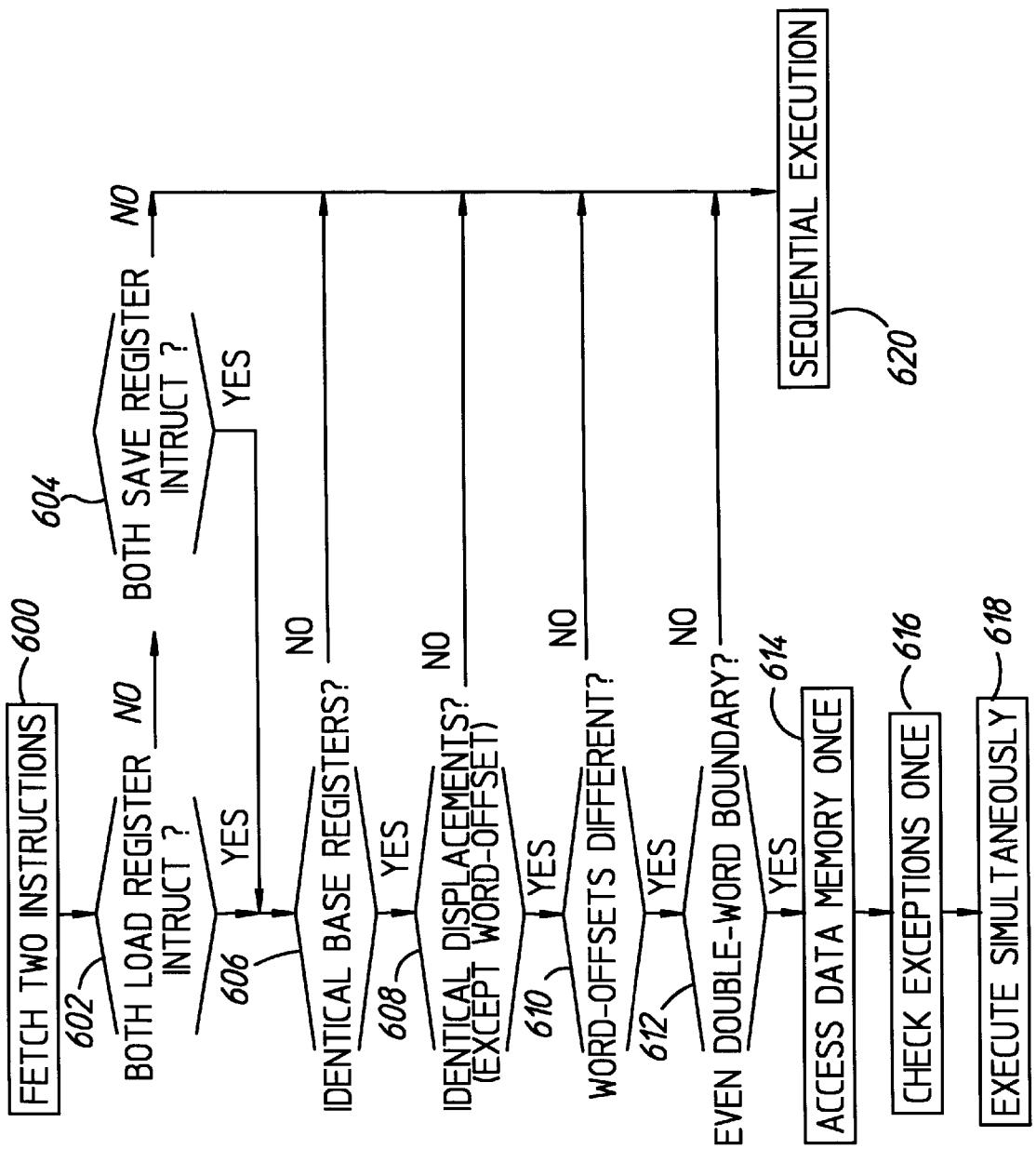

SIMULTANEOUS EXECUTION OF TWO MEMORY REFERENCE INSTRUCTIONS WITH ONLY ONE ADDRESS CALCULATION

CROSS REFERENCE TO RELATED APPLICATION(S)

This is a continuation of application Ser. No. 08/322,050 filed on Oct. 12, 1994, now abandoned.

FIELD OF INVENTION

This invention relates generally to digital computers and more specifically to load and save operations between registers and memory.

BACKGROUND OF THE INVENTION

Computer performance can be increased by executing multiple instructions simultaneously. In order to execute two general instructions simultaneously, a processor usually must generate two addresses, typically requiring two address pipelines, each of which consist of adders, transaction lookahead buffers, cache lookup, cache miss control logic and execution control logic. An additional address pipeline adds substantial circuit area and complexity. There are important classes of instructions, however, with related addresses that may not require generation of two separate addresses. For example, it is common in software to save the state of all of the registers before context switching (leaving one procedure to execute a different procedure). Consecutive register load and save operations often address consecutive memory addresses. For consecutive memory addresses, general address generation and exception checking may not be required on every memory address. That is, general address generation and exception checking may be required for the first memory address but not for subsequent consecutive addresses.

There is a need for a significant improvement in processor performance by enabling some simultaneous instruction execution without requiring all the additional circuit area and complexity of a second address pipeline. In particular, there is a need to detect and simultaneously execute pairs of instructions from one particularly important class of instructions (multiple register loading and storing) with a single address generation.

SUMMARY OF THE INVENTION

The invention improves processor performance by enabling execution of two consecutive load instructions or two consecutive write instructions while generating only one address. Generating a single address eliminates the need for an additional general address pipeline. In addition, for those load or store instructions that are executed simultaneously, exception checking is performed only once.

In the example embodiment, an instruction prefetch and decoder buffer checks for the occurrence of two consecutive load instructions or two consecutive write instructions. Individual registers and instructions are one word long. Memory is accessed two words (one double word) at a time. If the memory addresses of two consecutive memory access instructions are in the same double word of memory, the two instructions are executed simultaneously. Exception checking is performed only once. As a result, performance is improved for an important limited sequence of operations without having to provide the additional circuitry necessary for general multiple register load and save capability.

In the example embodiment, an address comprises a base address (register) plus a displacement. In the example embodiment, the hardware is simplified by constraining the base register contents to be on a double word boundary. As a result, no addition computation is needed to test for two addresses and the test is reduced to simple, fast compare (exclusive OR) functions.

BRIEF DESCRIPTION OF THE DRAWINGS

FIG. 6 is a flow chart of the method of the invention.

DETAILED DESCRIPTION OF THE PREFERRED EMBODIMENT OF THE INVENTION

Figure 1:
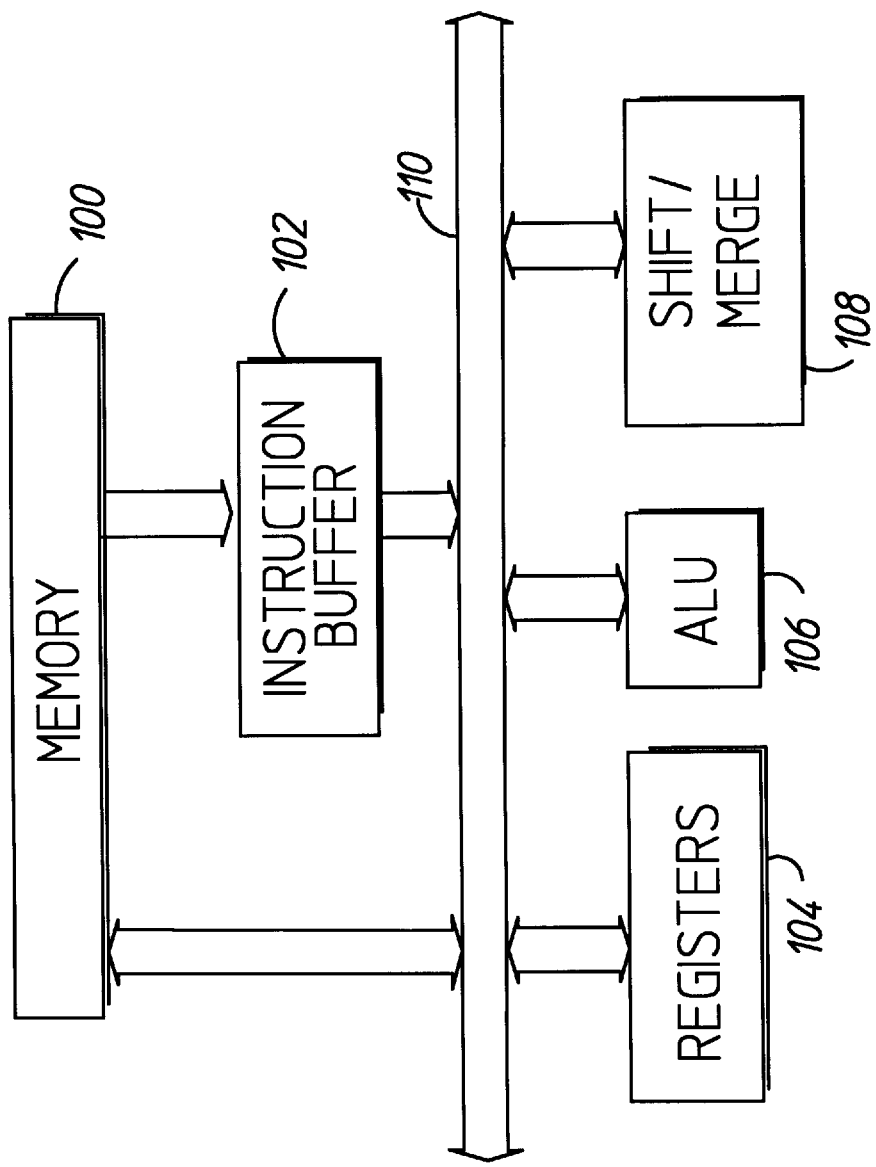
FIG. 1 is a block diagram of a computer processor containing the invention.

FIG. 1 is a block diagram of a computer processor to illustrate an example embodiment of the invention. A memory 100 contains both instructions and data. An instruction buffer 102 fetches and decodes instructions from memory 100 for execution. Instruction execution is register based, with all operands coining from registers 104 and all results going back into registers 104. Data to and from the registers 104 is transferred over a data bus 110. Instructions are executed by the instruction buffer 102 with assistance from one or more arithmetic logic units (ALU) 106 or shift/merge units 108. With some limitations, two instructions can be executed simultaneously. In the invention, the capability of simultaneous execution is rapidly verified for specific pairs of instructions. The instruction buffer is pipelined. That is, the instruction buffer contains a queue of instructions in various phases of completion so that while one or more instructions are being executed, others are being fetched from memory, addresses are being computed, and exception checking is being processed.

Figure 2:
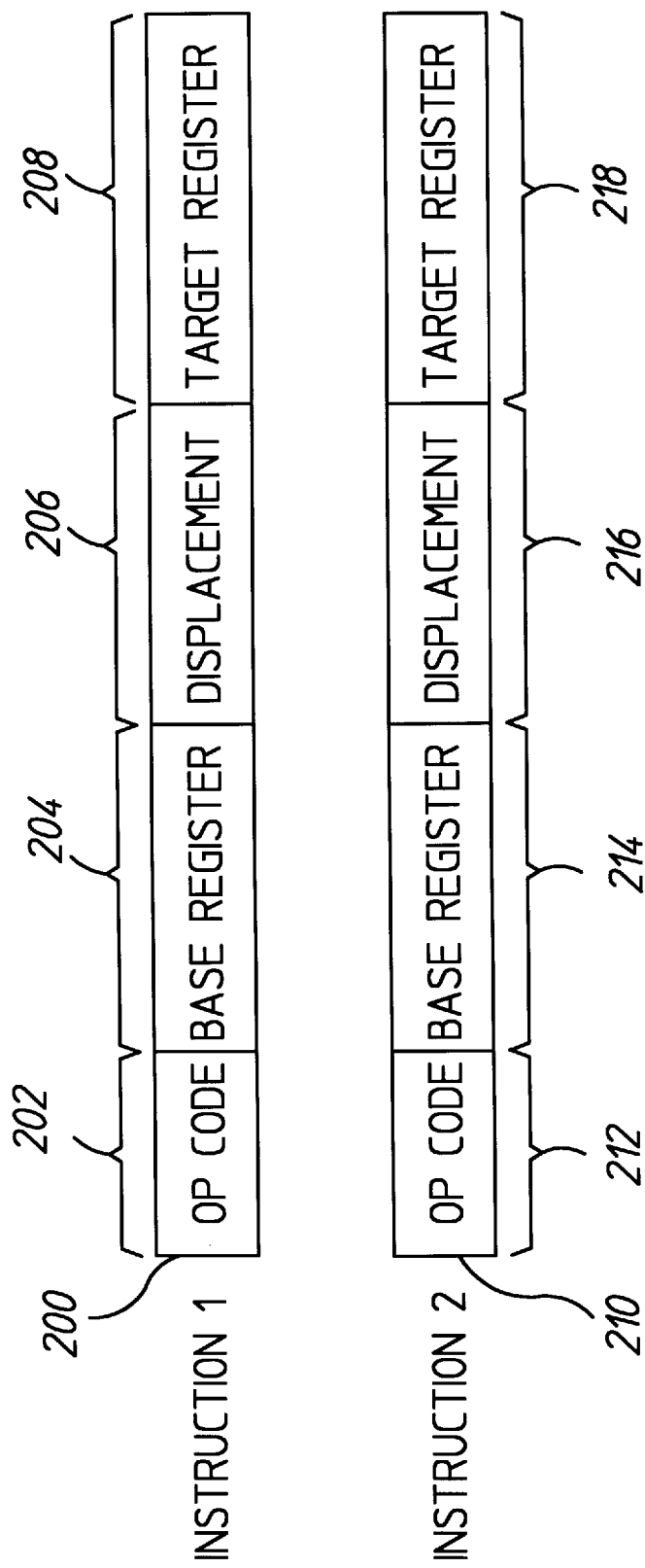
FIG. 2 is a block diagram illustrating instruction fields used by the processor of FIG. 1.

In the processor illustrated in FIG. 1, all memory addresses are based on a base register plus displacement addressing mode. The base address is stored in one or more registers. The displacement may be a field within an instruction. Alternatively, the displacement may be stored in an index register specified within an instruction. FIG. 2 illustrates two instructions (200, 210), each divided into various fields. All instructions have an operation code field (202, 212) designating the function to be performed, such as adding two numbers, branching, loading a register, or saving a register. The format of additional fields of each instruction vary according to the operation code. For the specific operation codes of loading a register and saving a register, the instructions include a field designating a data address base register (204, 214), a field containing a data address displacement (206, 216) (or a designation of a register containing the displacement) and a field designating the target register (208, 218) that will be loaded or saved. A complete data address is computed as the sum of the number contained in the base register (designated by fields 204 and 214) and a signed displacement (either the number in fields 206 and 216 or the number contained in a designated register). The displacement is added to the base address by ALU 106 in FIG. 1 during the pipelined execution process.

Figure 3:
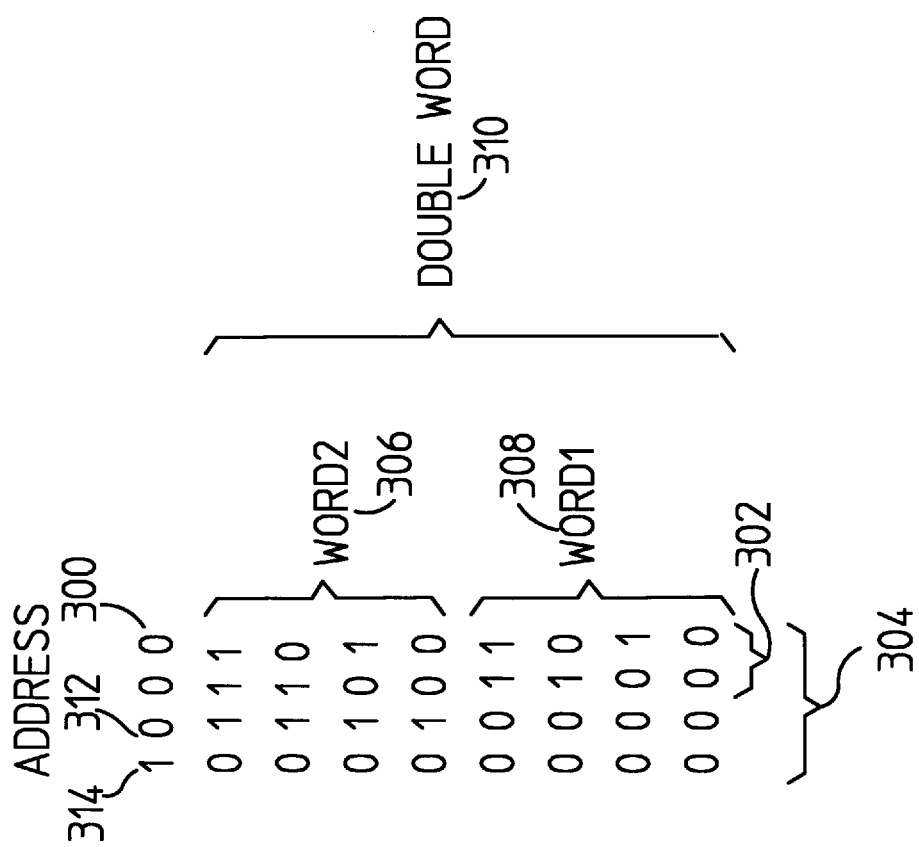
FIG. 3 is a table illustrating the memory address configuration used by to the processor of FIG. 1.

In a specific embodiment of the invention, words are 4 bytes (32 bits) and double words are 8 bytes (64 bits). Two registers are concatenated to form a 48 bit base address. Displacement is an instruction field of either 5 bits or 14 bits, or the displacement can be 32 bits in a register. FIG. 3 illustrates some binary addresses as used in the specific embodiment. Addressing is to the byte level (that is, incrementing the least significant bit 300 results in a displacement in memory of 8 bits). The two least significant bits 302 of an address designate the location of a byte within a word (306, 308). Two words form one double word 310. The three least significant bits 304 designate a byte within a double word 310. The third least significant bit 312 designates the location of a word within a double word. In this application, the third least significant bit is called the "word offset bit." Note that for all addresses in double word 310, the fourth least significant bit 314 is binary zero. Within the memory subsystem (FIG. 1, 100) accesses are always double words with a double word boundary where the three least significant bits (304) are all zero.

Table 1 below illustrates two example address computations.

TABLE 1

| BASE | 10011000 |
| --- | --- |
| DISPLACEMENT 1 | 00011100 |
| ADDRESS 1 | 10110100 |
| BASE | 10011000 |
| DISPLACEMENT 2 | 00011000 |
| ADDRESS 2 | 10110000 |

The two addresses in Table 1 have identical base addresses. In addition, the displacements differ only in the word offset bit (third least significant bit). Finally, note that the resulting addresses are in the same double word.

Table 2 below illustrates another pair of address computations.

TABLE 2

| BASE | 10011100 |
| --- | --- |
| DISPLACEMENT 1 | 00011100 |
| ADDRESS 1 | 10111000 |
| BASE | 10011100 |
| DISPLACEMENT 2 | 00011000 |
| ADDRESS 2 | 10110100 |

The two base addresses in Table 2 are identical. In addition, as in Table 1, the two displacement addresses differ only in the word offset bit. Note, however, that the two addresses in Table 2 are from different double words (the fourth least significant bit of Address 1 (binary one) is not identical to the fourth least significant bit of Address 2 (binary zero)).

One goal of the invention is to detect very early in the fetch process two consecutive load register instructions or two consecutive save register instructions having data addresses within the same double word. First, two consecutive operation codes (FIG. 2, 202 and 212) must be identical and must be either a load register operation code or a save register operation code. Second, both base registers (FIG. 2, 204 and 214) must be identical. Third, the displacements (FIG. 2, 206 and 216) must differ only in the third least significant bit. From the example in Table 2, it can be seen that these three simple tests are not sufficient to ensure that both addresses are within the same double word. In general, to ensure that both addresses are from the same double word requires adding the least significant four bits of the base address and the displacement to determine whether the fourth least significant bit of each of the data addresses is the same. Note in the examples in Tables 1 and 2 that the fourth least significant bits are different only if one of the two address additions results in an addition carry into the fourth least significant bit location and the other address does not result in a corresponding carry. If the byte alignment bits (FIG. 3, 302) are zero and if the word offset bit of the base address is binary zero (as in Table 1), then no carry will propagate past the word offset bit of the result. Therefore, a fourth requirement with a fast and simple test is to require the three least significant bits of the base address to be binary zero (logical false) (as in Table 1). Note that this easily implemented requirement is over restrictive in that it prevents some load and save instruction pairs from executing simultaneously, even though they have consecutive addresses that are actually within the same double word. However, a study of compilers indicates that compilers almost always keep base registers even word aligned, so that the easily implemented requirement is satisfactory for a substantial percentage of register load and save instructions.

Note that in some processors, only the word offset bit of the base address must be checked for binary zero, because non-zero byte offset bits are checked by other exception processing. In one specific embodiment, addresses are passed on for simultaneous execution after checking only the word offset bit of the base address, and if the byte-offset bits are non zero, a separate alignment test later in the fetch process prevents simultaneous execution.

In general, alignment as discussed above must be checked for each data address. The processor must also check various exceptions such as checking to see if it has permission to access a particular memory address. Without the invention, alignment and exception checking must be performed for every data address. With the invention, the alignment and exception checking is done on only one of the two addresses. If one word address within a double word passes the alignment and exception checking, there is no need to check the other word address within the double word. Therefore, the invention provides two benefits. The first is to permit simultaneous execution. The second is to reduce the exception processing required during simultaneous execution.

Figure 4:
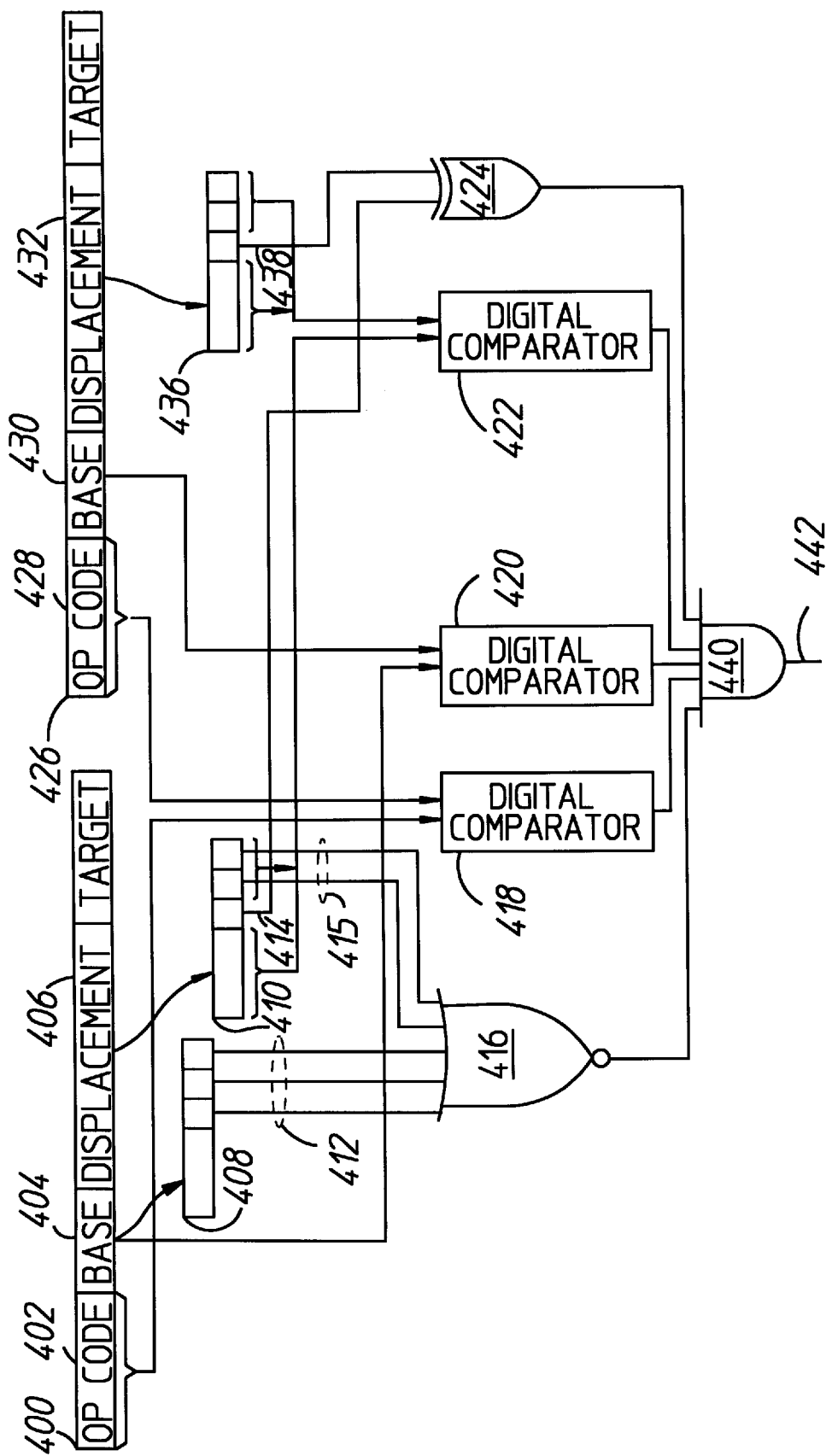
FIG. 4 is a logic diagram of one embodiment of the address comparison part of the invention.

FIG. 4 illustrates an embodiment that checks all three least significant bits for binary zero. In FIG. 4, operation code 402 of instruction 400 is compared to operation code 428 of instruction 426 by digital comparator 418. The base register field 404 of instruction 400 is compared to the base register field 430 of instruction 426 by digital comparator 420. The displacement field 406 of instruction 400 may be used directly or instruction 400 may designate a register 410. The displacement field 432 of instruction 426 may be used directly or instruction 426 may designate a register 436. Displacement fields 406 and 432 or the contents of registers 410 and 436, except for word offset bits 414 and 438, are compared by digital comparator 422. The base register field 404 of instruction 400 designates a register 408. The three least significant bits 412 of register 408 and the two least significant bits 415 of the displacements are verified to all be logical false by logical NOR gate 416. The word offset bits 414 and 438 of the displacements are verified to be different by logical EXCLUSIVE OR gate 424. Output 442 of logical AND gate 440 is logically true only if both operation codes are identical (comparator 418), both base addresses are identical (comparator 420), both displacements are identical except for the word offset bits (comparator 422), the word offset bits of the displacements are not identical (gate 424)

and the least three significant bits of the base address and the least two significant bits of the displacement are logically false (gate 416). If the output of gate 440 is logically true and both operation codes are either load register codes or save register codes then both instructions 400 and 426 are executed simultaneously.

Figure 5:
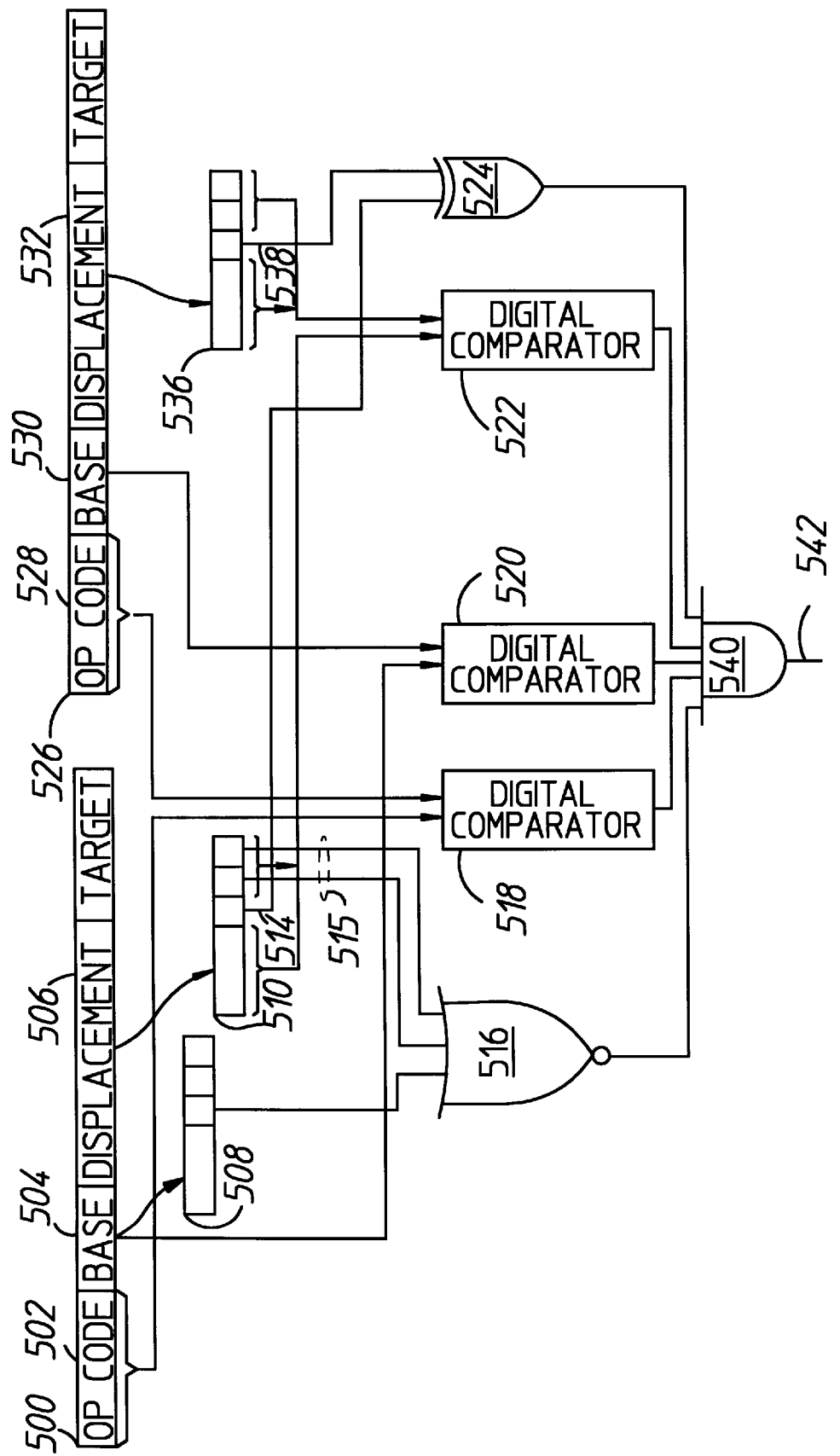
FIG. 5 is a logic diagram of an alternate embodiment of the address comparison part of the invention.

In FIG. 4, to ensure high speed for early detection, the least three significant bits of register 408 are copied into special fast circuitry (not illustrated) for verification of a logically false state. It is desirable to minimize the high speed circuitry. FIG. 5 illustrates an embodiment that minimizes the requirements for special high speed circuitry to a single bit. In the embodiment illustrated in FIG. 5, only the word offset bit of register 508 is checked for a logically false state.

In FIG. 5, operation code 502 of instruction 500 is compared to operation code 528 of instruction 526 by digital comparator 518. The base register field 504 of instruction 500 and the base register field 530 of instruction 526 are compared by digital comparator 520. The displacement field 506 of instruction 500 may be used directly or instruction 500 may designate a register 510. The displacement field 532 of instruction 526 may be used directly or instruction 526 may designate a register 536. Displacement fields 506 and 532 or the contents of registers 510 and 536, except for word offset bits 514 and 538, are compared by digital comparator 522. The base register field 504 of instruction 500 designates a register 508. The word offset bit 512 of the base address (register 508) and the least two significant bits (515) of register 510 are verified to be logical false by gate 516. The word offset bits 514 and 538 of the displacements are verified to be different by logical EXCLUSIVE OR gate 524. Output 542 of logical AND gate 540 is logically true only if both operation codes are identical (comparator 518), both base addresses are identical (comparator 520), both displacements are identical except for the word offset bits (comparator 522), the word offset bits of the displacements are not identical (gate 524) and the word offset bit of the base address and the two least significant bits of the displacement are logically false (inverter 516). If the output of gate 540 is logically true and both operation codes are either load register codes or save register codes then both instructions 500 and 526 are executed simultaneously.

Digital comparators (418, 420, 422, 518, 520, 522) may be implemented as EXCLUSIVE OR gates. For example, for digital comparator 418, an EXCLUSIVE OR gate receives the most significant bit of operation code 402 and the most significant bit of operation code 428. Another EXCLUSIVE OR gate receives the next most significant bits and so forth. The outputs of the EXCLUSIVE OR gates are connected to a multiple input NOR gate. The single output of the digital comparator is logically true only if all the inputs are logically identical. Likewise, the test to see if two instructions are both load register instructions or both save register instructions can be made by using a digital comparator to compare a newly fetched operation code with the known binary number corresponding to a load register operation code and a digital comparator to compare a the newly fetched operation code to the known binary number corresponding to a save register operation code.

FIG. 6 is a flow chart illustrating the method of the invention. Although illustrated as separate tests, note that all the tests in FIG. 6 may be executed simultaneously in hardware as illustrated in FIGS. 4 and 5. In FIG. 6, two instructions are fetched (step 600) and tested to see if both are load register instructions (test 602) or both save register instructions (test 604). If either condition is met, the instructions are tested for identical base registers (test 606), identical displacements (except word offset bits) (test 608), different word offset bits (test 610) and even double word alignment (test 612). If one of tests 602 and 604 are positive and all the remaining tests are positive, then both instructions are executed simultaneously (618). If both tests 602 and 604 fail or if any of the remaining tests fail, then the instructions are executed sequentially (620). In particular, successfully passing tests 602-612 enables step 614 (single data memory access) and step 616 (single exception checking) which in turn enable simultaneous execution with less hardware.

In summary, the system described above enables simultaneous execution of two register load or store instructions without having to generate and check two different addresses. Previous designs required two address pipelines, each of which consisted of adders, transaction lookahead buffers, cache lookup, cache miss control logic, and execution check logic. In the system described above, only one address pipeline is required, saving substantial circuit area and complexity.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of improving the performance of a computer processor, the method comprising the following steps:
   (a) extracting a first data address of a first instruction;
   (b) extracting a second data address of a second instruction, the first and second instructions having target registers that are not contiguous;
   (c) determining that the two data memory addresses are both in the same double word;
   (d) determining that the first and second instructions can be executed simultaneously based only on the outcome of step (c);
   (e) accessing data memory only once; and
   (f) executing the first and second instructions simultaneously.

2. The method of claim 1, step (d) further comprising:
   checking address exceptions once for the single data memory access.

3. A method of improving performance of a computer processor, the method comprising the following steps:
   (a) checking operation codes of two consecutive instructions, the two consecutive instructions having target registers that are not contiguous;
   (b) determining that the two consecutive instructions are both register load instructions;
   (c) checking a data address specified by each of the two consecutive instructions;
   (d) determining that the two data addresses are both in the same double word;
   (e) determining that the two consecutive instructions can be executed simultaneously based only on the outcome of step (d);

(f) accesing data memory only once; and (g) executing the two consecutive instructions simultaneously.

4. The method of claim 3, step (d) further comprising the following steps:

(d1) comparing a base register number of each of the two operand memory addresses;

(d2) determining that the two base registers are identical;

(d3) comparing a displacement address of each of the two data addresses;

(d4) determining that the two displacement addresses are identical except for a word address bit; and (d5) determining that the base addresses are on an even word boundary.

5. The method of claim 4, step (d5) further comprising the following step:

determining that (i) a word address bit and all lesser significant bits of one of the two base registers and (ii) all bits of lesser significance than the word address bit of one of the two displacement addresses are all logically false.

6. The method of claim 4, step (d5) further comprising the following step:

determining that a word address bit of one of the base registers is logical false.

7. A method of improving performance of a computer processor, the method comprising the following steps:

(a) checking operation codes of two consecutive instructions, the two consecutive instructions having target registers that are not contiguous;

(b) determining that the two consecutive instructions are both register save instructions;

(c) checking a data memory address specified by each of the two consecutive instructions;

(d) determining that the two data memory addresses are both in the same double word;

(e) determining that the two consecutive instructions can be executed simultaneously based only on the outcome of step (d);

(f) generating a single data address; and (g) executing the two consecutive instructions simultaneously.

8. The method of claim 7, step (d) further comprising the following steps:

(d1) comparing a base register number of each of the two operand memory addresses;

(d2) determining that the two base registers are identical;

(d3) comparing a displacement address of each of the two data memory addresses;

(d4) determining that the two displacement addresses are identical except for a word address bit; and (d5) determining that the base addresses are on an even word boundary.

9. The method of claim 8, step (d5) further comprising the following step:

determining that (i) a word address bit and all lesser significant bits of one of the two base registers and (ii) all bits of lesser significance than the word address bit of one of the two displacement addresses are all logically false.

10. The method of claim 8, step (d5) further comprising the following step:

determining that a word address bit of one of the base registers is logical false.

\* \* \* \* \*